United States Patent
Vlemmings et al.

(10) Patent No.: US 6,424,065 B1
(45) Date of Patent: Jul. 23, 2002

(54) STARTER-GENERATOR FOR A MOTOR VEHICLE

(75) Inventors: Johannes Vlemmings, Weil der Stadt; Torsten Mangold, Backnang; Juergen Glauning, Steinheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/701,913

(22) PCT Filed: Apr. 12, 2000

(86) PCT No.: PCT/DE00/01129

§ 371 (c)(1),
(2), (4) Date: Dec. 5, 2000

(87) PCT Pub. No.: WO00/61941

PCT Pub. Date: Oct. 19, 2000

(30) Foreign Application Priority Data

Apr. 12, 1999  (DE) .......................................... 199 16 459

(51) Int. Cl.[7] .............................. H02K 7/20; H02K 9/19; F02N 11/04
(52) U.S. Cl. .............................. 310/89; 310/42; 310/52; 310/54; 310/64; 310/68 B; 310/112; 310/211; 290/38 R; 290/38 C
(58) Field of Search ............................. 310/89, 211, 42, 310/112, 68 B, 52, 54, 64, 67 R; 290/1 R, 38 R, 38 C; 123/2, 179.28

(56) References Cited

U.S. PATENT DOCUMENTS

| | | | | |
|---|---|---|---|---|
| 2,862,120 A | * | 11/1958 | Onsrud | 310/89 |
| 4,262,224 A | * | 4/1981 | Kofink et al. | 310/54 |
| 5,103,127 A | * | 4/1992 | Peter | 310/113 |
| 5,770,904 A | * | 6/1998 | Rasch et al. | 310/75 R |
| 5,796,195 A | * | 8/1998 | Miyakawa | 310/68 B |
| 5,877,576 A | * | 3/1999 | Cochimin | 310/254 |
| 5,952,764 A | * | 9/1999 | Nakamura et al. | 310/261 |
| 6,011,335 A | * | 1/2000 | Belley | 310/89 |
| 6,133,659 A | * | 10/2000 | Rao | 310/89 |
| 6,181,038 B1 | * | 1/2001 | Van Rooij | 310/89 |

OTHER PUBLICATIONS

Patent Abstract of Japan vol. 012, No. 481 (E–694), Dec. 15, 1988 & JP 63 198562 A, Aug. 17, 1988.

* cited by examiner

Primary Examiner—Burton S. Mullins
(74) Attorney, Agent, or Firm—Michael J. Striker

(57) ABSTRACT

In a starter-generator for a motor vehicle, having an electrical machine that can be coupled selectively to an internal combustion engine and/or a transmission of the motor vehicle, the electrical machine (9, 12) is accommodated in a shallow cylindrical housing (5), which on axial opposed face ends is provided with means (28) for securing it to the engine or to a housing of the transmission. This makes it possible to combine the engine, the starter-generator, and the transmission into a compact, linear group.

15 Claims, 5 Drawing Sheets

STARTER-GENERATOR FOR A MOTOR VEHICLE

PRIOR ART

Figure 1:
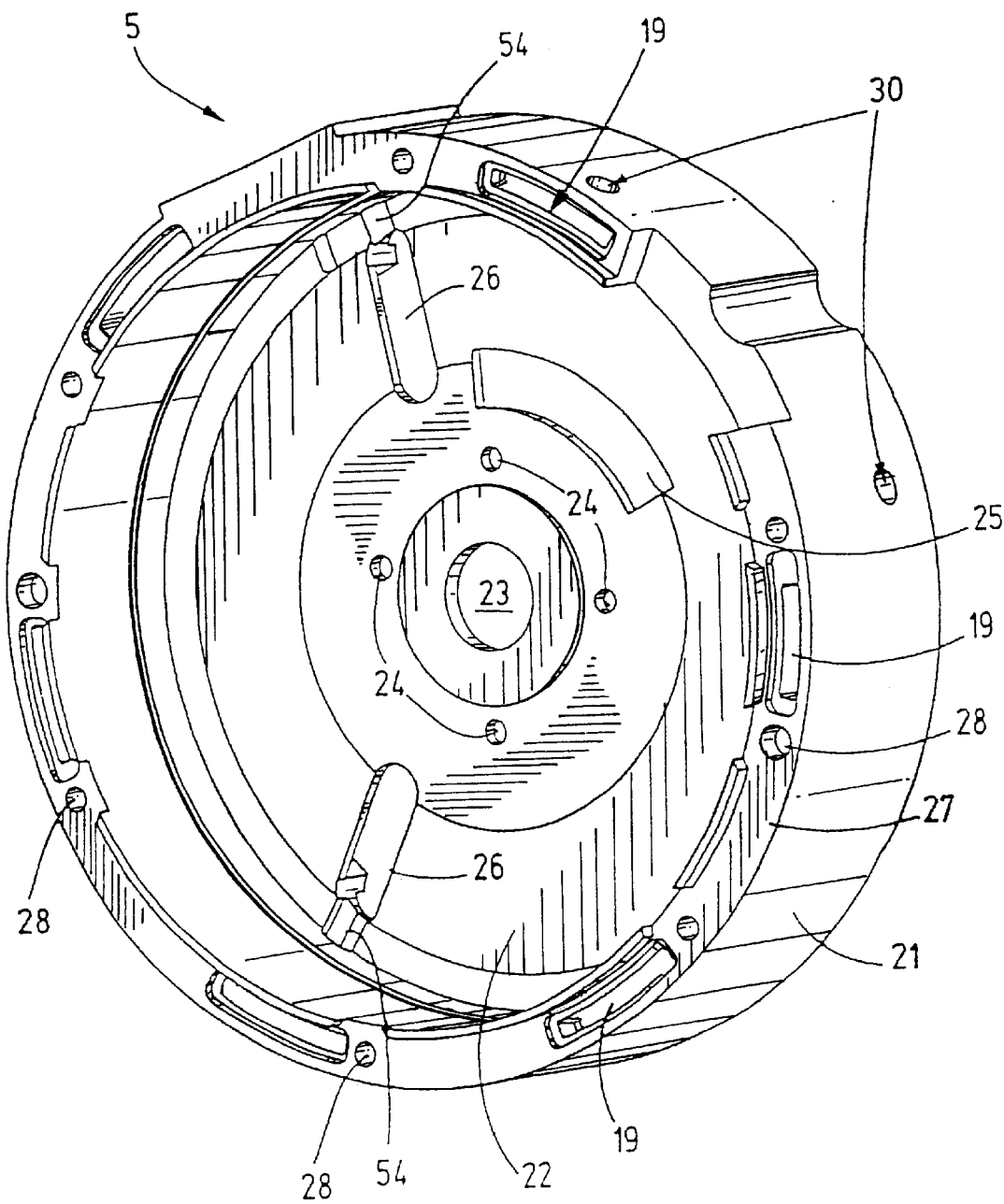

The invention relates to a starter-generator for a motor vehicle, having an electrical machine that can be coupled selectively to an internal combustion engine and/or a transmission of the motor vehicle. Known starter-generators of this kind are attached to the drive train of a motor vehicle via a belt drive or cone wheels. Both types of attachment mean that the starter-generator is laterally offset relative to a structural unit comprising the engine and the transmission, which makes it difficult to combine the starter-generator with the above two components to make a compact, space-saving component group.

ADVANTAGES OF THE INVENTION

The starter-generator of claim 1 makes it possible to create a compact structural unit, because with the aid of the starter-generator according to the invention as an intermediate element, the engine and transmission can be combined linearly into a unit.

With this kind of tightly packed arrangement, efficient cooling of the electrical machine of the starter-generator is important. It is therefore also proposed that a cooling conduit extends, swinging axially back and forth, in a radial outer wall of the housing be provided. This course of the cooling conduit not only makes it possible to make the cooling conduit longer than the circumference of the housing but also makes it possible, as means for securing the starter-generator to the engine or transmission housing, to provide blind bores for screws, bolts or the like, which each extend from one face end into the outer wall of the housing, at a point where the cooling conduit extends at a distance from the applicable face end. Thus despite the presence of the cooling conduit, the entire thickness of the radial outer wall is available for securing the starter-generator to the engine or the transmission housing. The housing of the starter-generator is preferably produced in one piece in a casting process. A casting core required for forming the cooling conduit, for example comprising molding sand, can be removed after the casting is done through slots on one of the end faces of the housing. These slots are expediently tightly closed after the casting core has been removed.

Alternatively, a casting core, for example comprising a plastic foam, that evaporates in the casting can be used. In such a case, it is possible to dissipate the resultant vapor via coolant connections of the cooling conduit that have to be provided anyway. Under these conditions, the aforementioned slots can be omitted.

The rotor of the electrical machine is expediently supported by a radially extending flange that is part of the housing. Between the flange and the rotor, an actuator can be provided, which acts as a final control element for actuating a coupling for the starter-generator.

A hollow chamber is formed on the side of the rotor toward the flange, which offers space for a pulse wheel and a sensor for detecting a rotation. To enable rotation of the rotor with the closest possible tolerances and consequently the smallest possible air gap between the rotor and an associated stator, the rotor is supported via roller bearings, that is, in particular via one or two ball or needle bearings.

In a preferred embodiment, the rotor includes a lamination packet with short-circuit rings and short-circuit bars as well as armoring rings, which are anchored on the ends of the short-circuit bars that protrude from the axial face ends of the lamination packet. By the provision of the armoring rings on the axial end faces, a weakening of the material comprising the short-circuit rings and short-circuit bars or the lamination packet, or an enlargement of the air gap, which would be necessary if the armoring rings were attached radially on the outside, is avoided. Nevertheless, the armoring rings offer effective protection of the—preferably copper—short-circuit bars against centrifugal force, and in particular they prevent the protruding ends of the short-circuit bars from flowing radially outward.

Additional functions of the armoring rings can be axially fixing the rotor to its hub or balancing the rotor. Selectively removing material from the armoring rings, especially from the radial inner side, makes exact balancing of the rotor possible without this having any effect on the mechanical stability or electrical properties of the rotor.

According to another preferred embodiment, the rotor includes a lamination packet with short-circuit conductors, and the short-circuit conductors are formed by lining recesses of the lamination packet, for instance by means of die-casting of aluminum. Since the material strength in this kind of rotor construction is greater than if copper short-circuit bars and short-circuit rings are used, the armoring rings can be omitted, which simplifies production and lowers assembly costs.

To make it possible for the axial structural length of the starter-generator to be kept as short as possible, it can be provided that the winding heads of the stator of the electrical machine are bent in the radial direction.

A stator of the electrical machine is preferably thermally joined to the housing. In this way, by simple means, a large-area thermal contact with considerable contact pressure and accordingly good heat transfer properties can be created between the stator and the housing.

Other advantageous refinements of the invention are recited in the ensuing description with reference to the drawings, and in the claims.

DRAWINGS

Shown are

Figure 2:
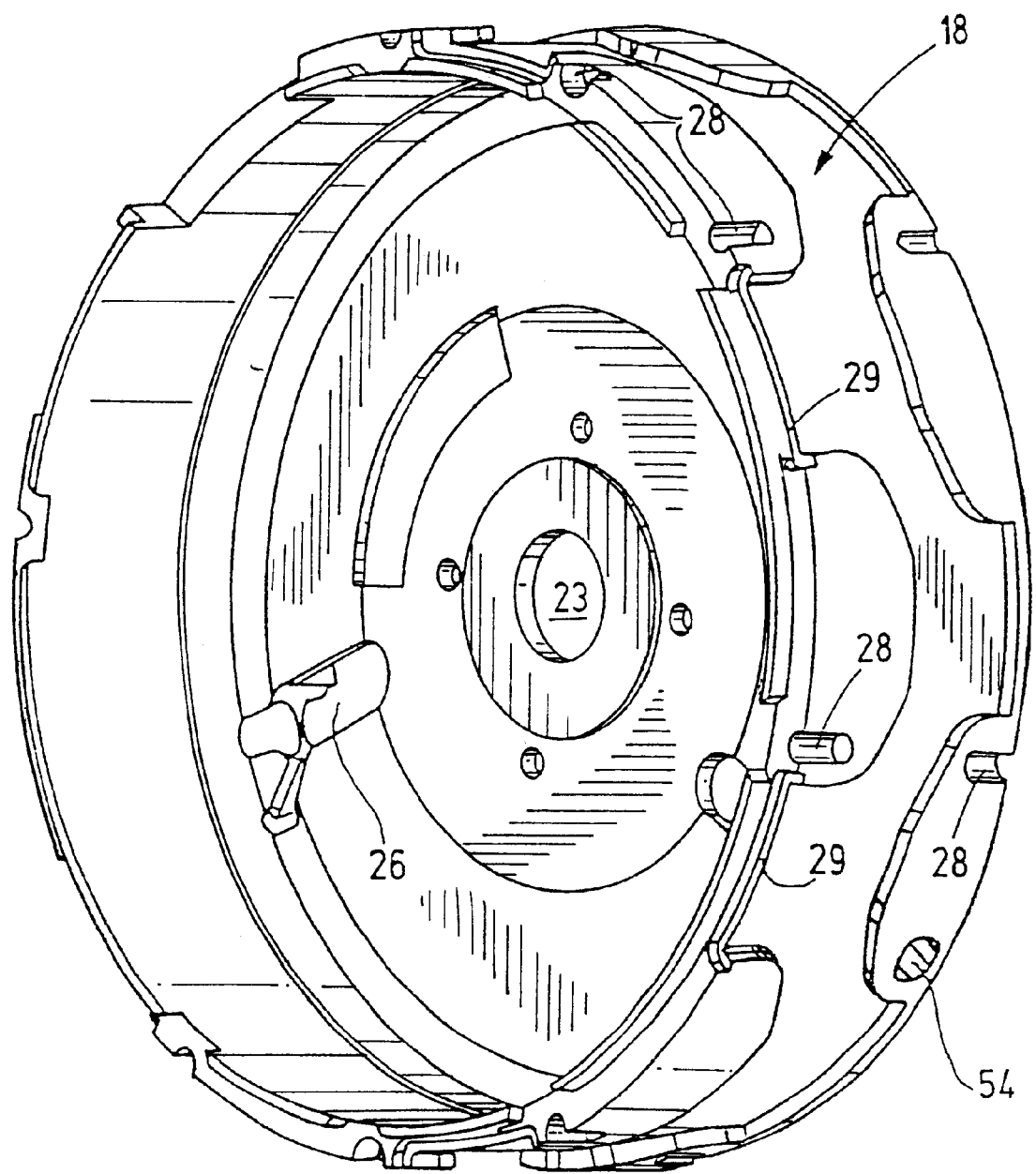
Figure 3:
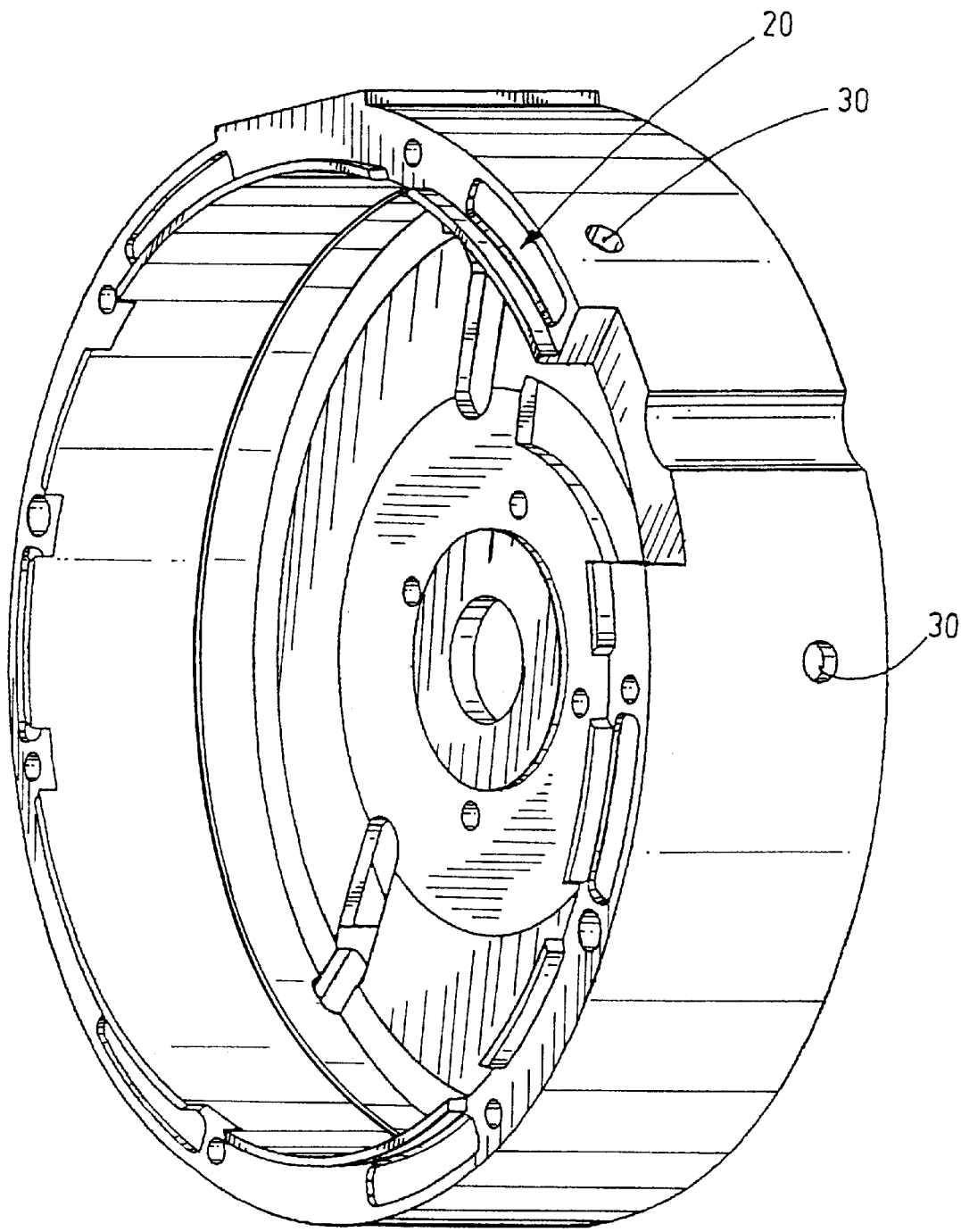
Figure 4:
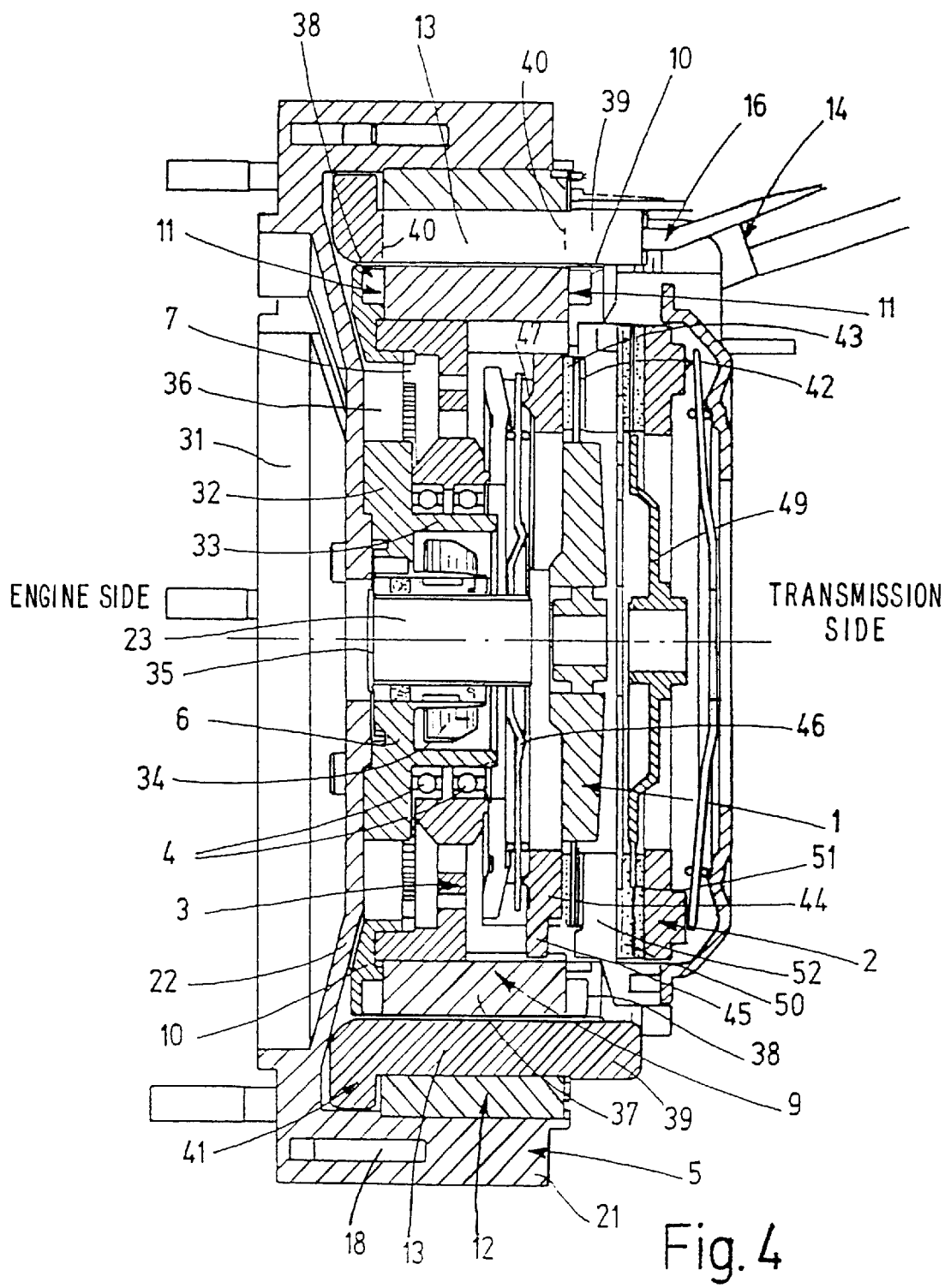

FIGS. 1, 2 and 3, perspective views of a housing of a starter-generator of the invention;

FIG. 4, a starter-generator in axial section; and

Figure 5:
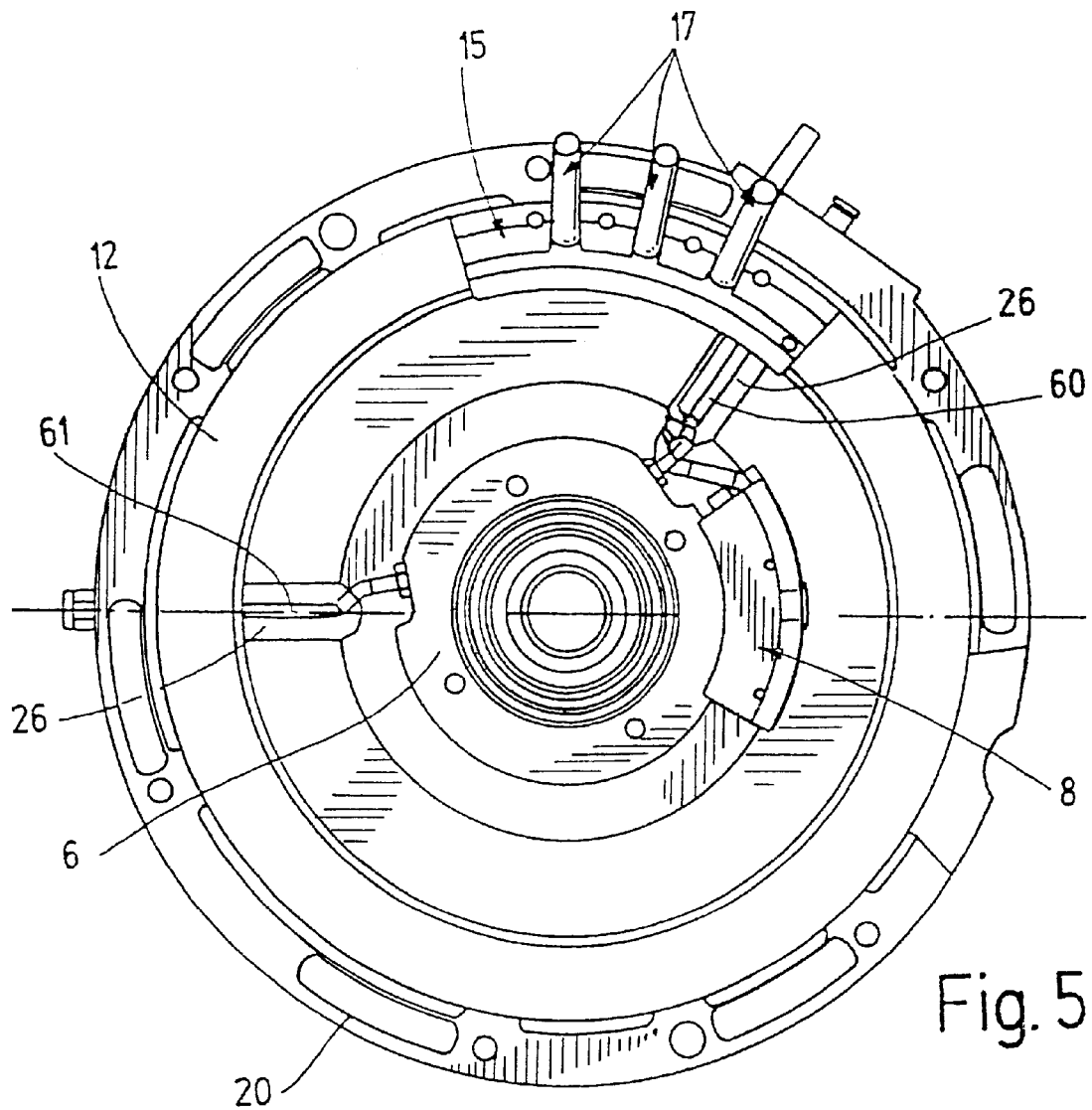

FIG. 5, a plan view on a housing with a mounted stator and actuator.

DESCRIPTION OF EXEMPLARY EMBODIMENTS

The housing 5, shown in perspective in FIG. 1, of a starter-generator essentially has a shallow cylindrical form, with an annular radial outer wall 21 and a flange 21 that extends substantially radially between a central opening 23 and the outer wall 21. Four bores 24 in the flange 22 serve to secure an actuator, which is not shown in FIG. 1 and will be described first in conjunction with FIG. 4. A circular-segmental cutout 25 in the flange 22 is provided, for receiving a sensor for detecting rotations of the electrical machine. Two radially oriented slots 26, and in extension of them, bores 54 through the outer wall 21 allow supply lines for the actuator and the sensor to be passed through, as will be described in further detail in conjunction with FIG. 5. On the face end 25 of the outer wall 21 oriented toward the observer, six slots 19 and between them threaded blind bores 28 can be seen. The slots 19 discharge at a cooling conduit, which extends, swinging back and forth, in the interior of the outer wall 21 between the face end 27 and the face end oriented away from the observer.

The course of this cooling conduit 18 can be seen in FIG. 2. FIG. 2 shows the same housing 5 as FIG. 1, but in the view of FIG. 2 the outer region of the outer wall 21 is left out, in order to give a clear view of the cooling conduit 18. As can be seen, the blind bores 28 are made from both face ends of the housing 5 into regions of the outer wall 21 in which the cooling conduit 18 extends at a distance from the applicable face end, and they have a depth with which they do not reach the cooling conduit 18.

The housing 5 is produced in one piece in a casting process. To produce the cooling conduit 18 with such a method, a sand core is first formed in the mold of the cooling conduit and placed in a casting mold for the housing. After the casting process, the sand core is removed from the cast workpiece through the slots 19.

Each of the slots 19 has an encompassing shoulder face 29, which is slightly indented relative to the face end 27 and acts as a stop for the placement of a closure plate 20, as shown in FIG. 3. A sealing ring can be disposed between the closure plate 20 and the shoulder face 29. The closure plates 20 are secured in an arbitrary suitable way in the slots 19, for example being press-fitted, calked or crimped, in order to seal off the slots 19.

It is understood that the openings used for removing the sand core after the casting need not necessarily have the form of slots 19. The possibility also exists, for example, of providing round openings, which can be tightly closed in an especially simple way by press-fitting a slightly oversized ball into it.

After the closure of the openings or slots 19, a cooling conduit 18 is obtained in the housing 5; this conduit extends tightly over the majority of the circumference of the housing 5 between two inlet and outlet openings 30 (see FIG. 1 or FIG. 3).

As an alternative to using casting sand for the mold of the cast body 18, it is also possible to consider using a plastic foam that evaporates when metal is poured into the casting mold of the housing. Since this vapor can be extracted via openings in the casting mold that correspond to the inlet and outlet openings of the housing, the use of such openings as the slots 19 for removal of the casting core can be avoided here, thus dispensing with one production step of the closure and sealing off of these openings.

FIG. 4 shows an axial section through a completely assembled starter-generator. The housing 5 with the outer wall 21 and the flange 22 can be seen. On the side of the flange 22 toward the engine, the housing 5 forms an indentation 31, which is provided for receiving a flywheel of the engine. An actuator 6 is screwed to the far side of the flange. The actuator includes both a securing plate 32, which is contact with the flange 22, and a cylindrical cuff 33 which accommodates a pneumatic or hydraulic final control element 34, whose function will be discussed later. Extending through the central bore 23 of the flange is a sleeve 35 of the actuator, and a crankshaft (not shown) of the engine extends through this sleeve.

Two ball bearings 4 are mounted on the outer face of the cuff 33 and axially retained by a snap ring. The two ball bearings 4, on their outer races, support a hub 3 of the rotor 9 of the starter-generator. By means of this arrangement, the rotor 9 is decoupled from any possible imbalance of the crankshaft and is guided very exactly in rotation, which enables the electrical machine to be mounted with close tolerances and a narrow air gap between the rotor 9 and a stator 12.

The hub 3, from the inside outward radially, includes a ring, whose inner profile is adapted to the shape of the ball bearings and which keeps the hub without play on the ball bearings; a disklike portion, which is partly pierced to economize on weight; and a cylindrical portion. On the side of the hub toward the flange 22, the disklike portion and the cylindrical portion form a hollow chamber 36. A pulse wheel 7, in this case in the form of a gear ring, is disposed on the inner wall of the cylindrical portion, with teeth pointing into the hollow chamber 36. The pulse wheel 7 is produced as either a solid part or made from stamped metal sheets and is fixed in the cylindrical portion by welding, screwing or riveting. A sensor (not shown in the drawing) disposed in the hollow chamber 36 detects the rotary speed and direction of rotation of the teeth of the pulse wheel.

The rotor 9 further includes a lamination packet 37, which is thermally joined to the outer circumference of the cylindrical portion of the hub 3 and in which copper short-circuit rings 12 and short-circuit bars 11 are embedded. These short-circuit rings and short-circuit bars 11 are connected to one another by soldering, ultrasonic or laser beam welding, or cold pressing. All that can be seen of the short-circuit bars 11 in the drawing is the ends protruding axially from both sides of the lamination packet 37. The ends engage annular grooves 38 of armoring rings 10, which each extend along the radial end faces of the lamination packet 37 and of the cylindrical portion of the hub 3. The radial outer sides of the grooves 38 are each press-fitted onto the ends of the short-circuit bars 11. Thus they keep the armoring rings 10 in position and prevent the ends of the armoring rings from flowing outward in response to the centrifugal force acting on them in operation.

The armoring rings 10 can comprise steel or a fiber reinforced plastic. For balancing the rotor, material can be removed locally from the armoring rings 10, specifically and preferably from the radially inner region of them.

A radially inward-oriented extension of the armoring ring 10 oriented toward the flange 22 engages the inside of the hollow chamber formed by the hub 3, and there forms an axial retainer for the pulse wheel 7.

In a modification of the rotor construction, not shown in the drawing, the rotor includes a lamination packet in which pre-formed conduits for the short-circuit bars are lined with metal, especially aluminum. Short-circuit rings are also formed by casting on the face ends of the lamination packet. Production by casting is simple and economical and produces a rotor with good mechanical loading capacity, but the use of aluminum does not allow as compact a structure as can be attained with the inserted rings and bars 11 of copper.

A stator 12 rests on the inside of the radial outer wall 21 of the housing 5. The stator and the outer wall 21 are preferably thermally joined, in order to assure good thermal contact between the two, over a large cross-sectional are. Winding heads 13 of the stator 12 each include pole pieces, oriented toward the rotor, and coils 39 wound around the pole pieces. The axial length of the pole pieces is equivalent to the axial length of the lamination packet 37 of the rotor 9, as suggested by dashed lines 40 in the drawing.

To keep the radius of the starter-generator short, the axially oriented coils 39 of the winding heads 13 are wound with an only slight length but great thickness. To accommodate such a coil 39 in a space-saving way in the housing 21, a region 41 of the coils that is oriented toward the flange 22 is angled radially outward.

With its tip, the crankshaft that passes through the sleeve 35 engages a bore of a coupling flange 1, whose radially outer regions are clamped in the position shown in FIG. 4 between two friction rings 42, 43. The friction ring 43 is secured to a transmitter ring 44, which is in nonpositive engagement, via radial protrusions 45, with the hub 3. A plate spring 46 is fastened between an annular protrusion 47 of the transmitter ring 44 and a disk 48 supported by the hub 3. In this position, the coupling is closed, and torque is transmitted from the crankshaft to the electrical machine. The coupling connects the rotor of the electrical machine to the flywheel, accommodated in the indentation 31 but not shown in FIG. 4, to form a two-mass oscillator, which is capable of damping oscillations of the engine and electrical machine system, or shifting them into a frequency range that is outside the rpm range of the engine.

Outward motion of the actuator to the right in the drawing causes its tip to come into contact with the inner region of the plate spring 46, pivoting the plate spring into itself and causing the pressure of the plate spring 46 on the annular protrusion 47 to lessen. Under these conditions, the transmitter ring 44 is urged away from the coupling flange 1 by a spring (not shown), so that the coupling flange 1 can rotate freely.

An analogously constructed coupling 2 is mounted on the transmission side of the starter-generator. It includes a coupling flange 49 which is coupled to the transmission and whose radially outer region is clamped between friction rings 50, 51. A friction ring 50 and the friction ring 42 are mounted on opposed sides of a slaving ring 52. By exertion of an axial pressure toward the left in the drawing upon a central region of a plate spring 53, the pressure exerted by a radially outer region of the plate spring 53 upon a carrier of the friction ring 51 is reduced, making the coupling flange 49 freely rotatable.

Thus both the crankshaft of the engine and the transmission can be coupled selectively to the starter-generator. The starter-generator is thus usable selectively as a starter for the engine, as the sole driving motor of the vehicle, as a backup motor, or as a generator during travel.

FIG. 5 also shows a plan view on the housing 5 from the right in FIG. 4. The actuator 6 is located in the middle of the housing. A compressed air supply line 60 for actuating the actuator and a pressure compensation line 61 each extend through slots 26 in the flange 22. Also extending through one of the slots is a signal line 62 to a sensor holder 8, in which the sensor, already mentioned, for detecting the rotary of the rotor is accommodated.

Three supply cables 19 for the three phases of the stator 12 are secured by a tension relief means 15 screwed to the face end of the stator.

The starter-generator described above can be manufactured together with the couplings entirely as a complete structural group and tested before being installed in a vehicle.

What is claimed is:

1. A starter-generator for a motor vehicle, comprising an electrical machine that can be coupled selectively to an internal combustion engine or a transmission housing of the motor vehicle, wherein the electrical machine (9, 12) is disposed in a shallow cylindrical housing (5), said cylindrical housing (5) having axially opposed end faces, wherein each of said axially opposed end faces is provided with means (28) for securing it to the engine or to the transmission housing, wherein the housing includes a radially extending flange (22), said flange (22) supporting a rotor (9) of the electrical machine, wherein a hollow chamber (36) is formed on a side of the rotor (9) toward the flange (22), and wherein a pulse wheel (7) and a sensor for detecting a rotation of the pulse wheel (7) are arranged in said hollow chamber (36).

2. The starter-generator of claim 1, wherein a cooling conduit (18) extends in a radial outer wall (21) of the housing (5).

3. The starter-generator of claim 2, wherein the securing means (28) are blind bores, each of said blind bores extending from one of said end faces into the outer wall (21) of the housing (8) at a point where the cooling conduit (18) extends at a distance from the applicable end face.

4. The starter-generator of claim 2, wherein the housing (5) is produced in a casting process, wherein one of the end faces of the housing (5) is provided with slots (19) for removal of a casting core that defines the cooling conduit (18).

5. The starter-generator of claim 4, wherein the slots (19) are closed by insert parts (20) after the removal of the casting core.

6. The starter-generator of claim 4, wherein the housing is produced in a casting process in which a casting core that defines the cooling conduit (18) evaporates in the casting, and the vapor is dissipated via coolant connections (30) of the cooling conduit.

7. The starter-generator of claim 1, wherein an actuator (6) is disposed between the rotor (9) and the flange (22).

8. The starter-generator of claim 1, wherein the rotor (9) is supported by roller bearings (4).

9. The starter-generator of claim 1, wherein the rotor (9) includes a lamination packet (37) with short-circuit rings and short-circuit bars (11) and armoring rings (10), wherein said lamination packets have axial end faces, said armoring rings (10) anchored proximate to the ends of the short-circuit bars (11), and wherein said short-circuit bars (11) protrude from the axial end faces of the lamination packets (37).

10. The starter-generator of claim 9, wherein the armoring rings (10) have annular grooves (38) for receiving the protruding ends.

11. The starter-generator of claim 9, wherein the armoring rings (10) comprise steel or fiber composite material.

12. The starter-generator of claim 9, wherein at least one armoring ring (10) is provided for balancing the rotor (9).

13. The starter-generator of claim 1, the rotor includes a lamination packet with short-circuit conductors, and the short-circuit conductors are formed by lined recess of the lamination packet.

14. The starter-generator of claim 1, wherein a stator (12) of the electrical machine has winding heads (13) that are bent in the radial direction.

15. The starter-generator of claim 1, wherein a stator (12) of the electrical machine is connected to the housing (5), such that a thermal contact exists over a cross-sectional area between said stator (12) and said housing (5).

* * * * *